(12) United States Patent
Ferenz et al.

(10) Patent No.: US 8,030,366 B2
(45) Date of Patent: Oct. 4, 2011

(54) USE OF POLYETHERS CONTAINING URETHANE FOR UREA GROUPS FOR STABILIZING POLYURETHANE FOAMS

(75) Inventors: Michael Ferenz, Essen (DE); Christian Eilbracht, Herne (DE); Jutta Esselborn, Esse (DE); Sascha Herrwerth, Essen (DE); Gabriele Platte, Castrop-Rauxel (DE)

(73) Assignee: Evonik Goldschmidt GmbH, Essen (DE)

( * ) Notice: Subject to any disclaimer, the term of this patent is extended or adjusted under 35 U.S.C. 154(b) by 808 days.

(21) Appl. No.: 11/851,087

(22) Filed: Sep. 6, 2007

(65) Prior Publication Data
US 2008/0076842 A1 Mar. 27, 2008

(30) Foreign Application Priority Data
Sep. 8, 2006 (DE) .................. 10 2006 042 338

(51) Int. Cl.
*C08J 9/00* (2006.01)
(52) U.S. Cl. .......... 521/137; 521/88; 521/114; 521/115; 521/116; 521/117; 521/118; 521/159; 521/170; 521/172; 521/173; 521/174
(58) Field of Classification Search .................. 521/159, 521/170, 172, 173, 174, 88, 114, 115, 116, 521/117, 118, 137
See application file for complete search history.

(56) References Cited

U.S. PATENT DOCUMENTS

| | | | | |
|---|---|---|---|---|
| 4,427,798 A | | 1/1984 | Koenig | |
| 4,701,474 A | * | 10/1987 | Bailey et al. | 521/137 |
| 5,082,868 A | | 1/1992 | Burkhart et al. | |
| 5,132,332 A | * | 7/1992 | Wallaeys et al. | 521/109.1 |
| 5,674,918 A | * | 10/1997 | Bhattacharjee et al. | 521/114 |
| 5,808,131 A | * | 9/1998 | Gruenbauer et al. | 560/25 |
| 6,147,181 A | * | 11/2000 | Michels et al. | 528/76 |
| 6,458,861 B1 | * | 10/2002 | Younes | 521/130 |

FOREIGN PATENT DOCUMENTS

| | | |
|---|---|---|
| EP | 0061058 A | 9/1982 |
| EP | 0301307 A | 2/1989 |
| GB | 1045175 A | 10/1966 |

* cited by examiner

*Primary Examiner* — John Cooney
(74) *Attorney, Agent, or Firm* — Frommer Lawrence & Haug LLP

(57) ABSTRACT

The invention relates to the use of polyethers containing urethane or urea groups as foam stabilizers, obtained by reacting at least one isocyanate with (a) at least one hydrophilic polyether which statistically carries at least one OH and/or $NH_2$ and/or NH function and (b) at least one hydrophobic polyether which statistically carries at least one OH and/or $NH_2$ and/or NH function and optionally (c) further compounds which carry at least one OH and/or $NH_2$ and/or NH function and/or other isocyanate-reactive groups, such as carboxyl or epoxide functions, with the proviso that at least one isocyanate is ≧difunctional.

11 Claims, No Drawings

USE OF POLYETHERS CONTAINING URETHANE FOR UREA GROUPS FOR STABILIZING POLYURETHANE FOAMS

This application claims benefit under 35 U.S.C. 119(a) of German patent application DE 10 2006 042 338.0, filed on 8 Sep. 2006.

Any foregoing applications [including German patent application DE 10 2006 042 338.0, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to the use of novel foam stabilizers for the production of polyurethane and/or polyisocyanurate foams.

Rigid polyurethane foams are used in a variety of applications, for example for thermal insulation, for energy absorption and for sound absorption. In the industrial production of polyurethane foams, foam stabilizers are used as process auxiliaries. The properties of the foam formed depend in particular on the structure and the chemical composition of the foam stabilizer used. These emulsify the raw materials used, stabilize the foam during the production process and permit the formation of a homogeneous foam having a uniform pore structure, desired cell fineness and open-cell character.

Foam stabilizers used are generally polysiloxane-polyoxyalkylene block copolymers. These stabilizers are highly effective and can be adapted to the foaming system and the foaming process by a suitable choice of the structure and of the composition. However, in polyurethane foams, the siloxane content of these block copolymers leads to a substantial deterioration in the fire behavior in the sense of an adverse effect on the flammability. Furthermore, owing to the method of production, these silicone-based stabilizers always contain a considerable proportion of low molecular weight, volatile cyclic and linear siloxanes, which may have undesired effects, such as a significant contribution to the emission ("fogging"—"VOC"), during the subsequent use of the foam. Furthermore, it was observed that the surfaces of the foams obtained are poorly wettable with the use of organosilicon stabilizers, with the result that subsequent surface treatments, such as, for example, coating and the application of a plurality of foam layers, are complicated.

Attempts have therefore been made to prepare silicon-free stabilizers which do not have these disadvantages. Si-free foam stabilizers have already been mentioned many times in the patent literature. In addition to simple surfactants, e.g. alkoxylated derivatives of nonylphenol (U.S. Pat. No. 5,236,961), alkoxylated fatty alcohols (EP-A-0 343 463), fatty acid esters and amides (DE-A-19 521 351), polyethers whose effectiveness is said to be based on the presence of butylene oxide units were also described (WO-A-95/16721). OH compounds of different functionality, but also amines (ethylenediamine, ammonia and ethanolamine), are mentioned as initiators.

Stabilizers based on partly or completely fluorinated compounds, as described, for example, in U.S. Pat. No. 4,356,273, are likewise Si-free. According to a further proposal, the polyol moiety and perfluoro moiety of the molecule are coupled in each case via ether, amino, amido or sulfonamido groups.

DE-A-2 240 350 describes a process for the preparation of Si-free stabilizers, which were prepared by free radical polymerization of N-vinylpyrrolidone and mixtures of N-vinylpyrrolidone and dibutyl maleate or N-vinylpyrrolidone, dibutyl maleate and vinyl acetate in polyfunctional polyetherpolyols.

DE-A-25 00 017 and U.S. Pat. No. 4,091,030 describe Si-free stabilizers which are prepared by free radical polymerization of cyclic, nitrogen-containing monomers (N-vinylamides) and an ester of an unsaturated dicarboxylic acid in polyfunctional polyetherpolyols.

Surprisingly, it was found that polyethers containing urethane or urea groups are capable of acting as foam stabilizers.

The invention relates to the use of polyethers containing urethane or urea groups as foam stabilizers, obtained by reacting A. at least one isocyanate with B. (a) at least one hydrophilic polyether which statistically carries at least one OH and/or $NH_2$ and/or NH function and
(b) at least one hydrophobic polyether which statistically carries at least one OH and/or $NH_2$ and/or NH function and optionally
(c) further compounds which carry at least one OH and/or $NH_2$ and/or NH function and/or other isocyanate-reactive groups, such as carboxyl or epoxide functions, with the proviso that at least one isocyanate A. is $\geq$ difunctional.

The aim of the reaction of the abovementioned compounds is the preparation of products in which the hydrophobic polyethers are linked to the hydrophilic polyethers.

In the reaction of isocyanates with alcohols or amines, the corresponding urethane or urea derivatives form. Compounds in the form of mixtures whose distribution is determined by the reaction procedure but also by statistical laws form in the reaction of the abovementioned components.

Suitable polyfunctional isocyanates may be both aromatic and aliphatic. Examples are methylenediphenyl isocyanate (MDI), toluene diisocyanate (TDI), 1,6-hexamethylene diisocyanate, 1-isocyanato-3,5,5-trimethyl-1,3-isocyanatomethylcyclohexane (IPDI) or polymethylenediphenyl isocyanate (PMDI). Furthermore, trifunctional and polyfunctional isocyanates, which are obtainable, for example, under the tradenames Desmodur® N 100 and Desmodur® N 3600, are also suitable. In combination with polyfunctional isocyanates, it is also possible to use mono-functional isocyanates in the reaction mixture, in particular for controlling the polarity and molecular weight distribution.

Those polyethers in which more than 60 mol % of the alkoxy units are ethylene oxide units are designated here as hydrophilic polyethers. Those polyethers in which not more than 45 mol % of the alkoxy units are ethylene oxide units are designated here as hydrophobic polyethers.

Suitable polyethers can be obtained by reacting an initiator, which is preferably an alcohol, an amine or an alkanolamine, by an additional reaction of monomers. Initiator alcohols may be, for example, water, methanol, ethanol, 1-butanol, bisphenol A, 2-aminoethanol, ethylene glycol, propylene glycol, glycerol, oligo- and polyglycerols, 1,3-dihydroxypropane, 1,4-dihydroxybutane, 1,6-dihydroxyhexane, 1,2,4-trihydroxybutane, 1,2,6-trihydroxyhexane, 1,1,1-trimethylolpropane, pentaerythritol, oligomers of pentaerythritol, polycaprolactone, xylitol, arabitol, sorbitol, mannitol, ethylenediamine, ammonia, 1,2,3,4-tetrahydroxybutane, castor oil or fructose.

The polyglycerols used according to the invention are firstly linear compounds of the general formula

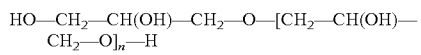

in which
n is from 1 to 9, preferably from 1 to 6, in particular from 1 to 3, especially 1 and 2.

In addition, the polyglycerols used may also be branched and may contain cyclic moieties. They contain from about 0 to 5% by weight of glycerol, from 15 to 40% by weight of diglycerol, from 30 to 55% by weight of triglycerol, from 10 to 25% by weight of tetraglycerol and from 0 to 10% by weight of higher oligomers. The polyglycerols preferably used according to the invention contain from 15 to 35% by weight of diglycerol, from 38 to 52% by weight of triglycerol, from 15 to 25% by weight of tetraglycerol, <10% by weight of higher oligomers and <2% by weight of cyclic compounds. Polyglycerols which on statistical average contain diglycerol are particularly preferably used.

Suitable monomers are, for example, ethylene oxide, propylene oxide, compounds from the group consisting of tetrahydrofuran, 1,2-epoxybutane (n-butylene oxide), 2,3-epoxybutane (isobutylene oxide) and dodecyl oxide. The distribution of the monomers may be chosen as desired, so that, for example, blocks may be present. Moreover, it is also possible to use a mixture of the monomers, so that polyethers in which the units are present in random distribution or have a gradual distribution are obtained. Such polyethers can be randomly arranged or have a block structure.

Suitable hydrophilic polyethers, which carry one or more active hydrogen atoms, can be described by formula (I)

in which
$R^1$, in the case of a=1, is an e-functional nonreactive moiety of an initiator,
$R^2$, independently of one another, are O, $NR^4$, NH or N,
E is an ethoxy function, preferably the radical —($CH_2$—$CH_2$—O),
P are identical or different alkoxy function(s) having at least three carbon atoms,
$R^3$ are identical or different radicals from the group consisting of H, —$C_fH_{2f}$—N($R^4$)H and —$C_fH_{2f}$—$NH_2$,
$R^4$ are identical or different alkyl or aryl functions having 1 to 20 carbon atoms, preferably methyl, ethyl or phenyl,
a is 0 or 1,
b is 1, 2 or 3,
c is from 10 to 500, preferably from 15 to 400, in particular from 20 to 300,
d is from 0 to 330, preferably from 0 to 200, in particular from 0 to 100,
e is from 1 to 10, preferably from 2 to 8, in particular from 2 to 4,
f is from 2 to 5,
with the proviso that
c>0.6 (c+d).

Suitable hydrophobic polyethers which carry one or more active hydrogen atoms can likewise be described by formula (I),
in which
c is from 0 to 400, preferably from 0 to 300, in particular from 0 to 200,
d is from 10 to 500, preferably from 15 to 400, in particular from 20 to 300,
with the proviso that
c<0.45 (c+d).

The polyethers described by the formula (I) can optionally be further modified by the graft polymerization process. For this purpose, the polyethers are reacted with monomers carrying double bonds in the presence of free radical activators. By the adjustment of the degree of grafting and the amount and type of the monomers used or by the procedure for the preparation of the copolymers, it is possible to modify the properties of the polyethers in a targeted manner. Suitable monomers are, for example, methyl methacrylate, acrylic acid, styrene or maleic anhydride. A process of this type is described, for example, in the published application DE-1 111 394. The polyethers described in the literature can also be used according to the invention if they carry statistically at least one OH and/or $NH_2$ and/or NH function. The content of the abovementioned literature and patent literature on the chemical characterization of the polyether is therefore hereby incorporated as reference and is considered to be part of the disclosure content of the present application.

Special examples of suitable hydrophilic polyethers are:

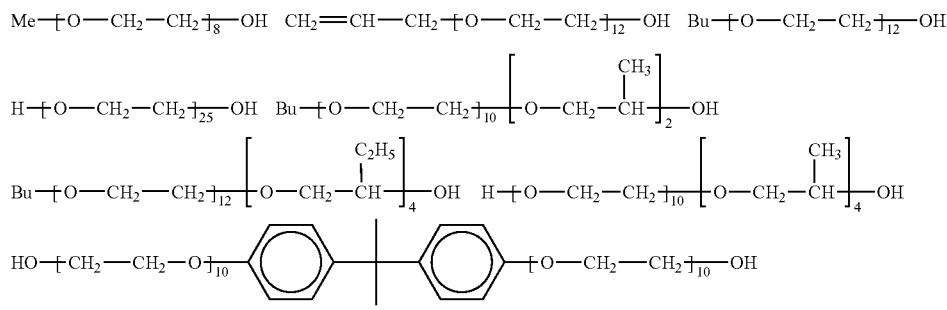

Special examples of suitable hydrophobic polyethers are:

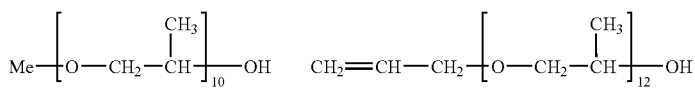

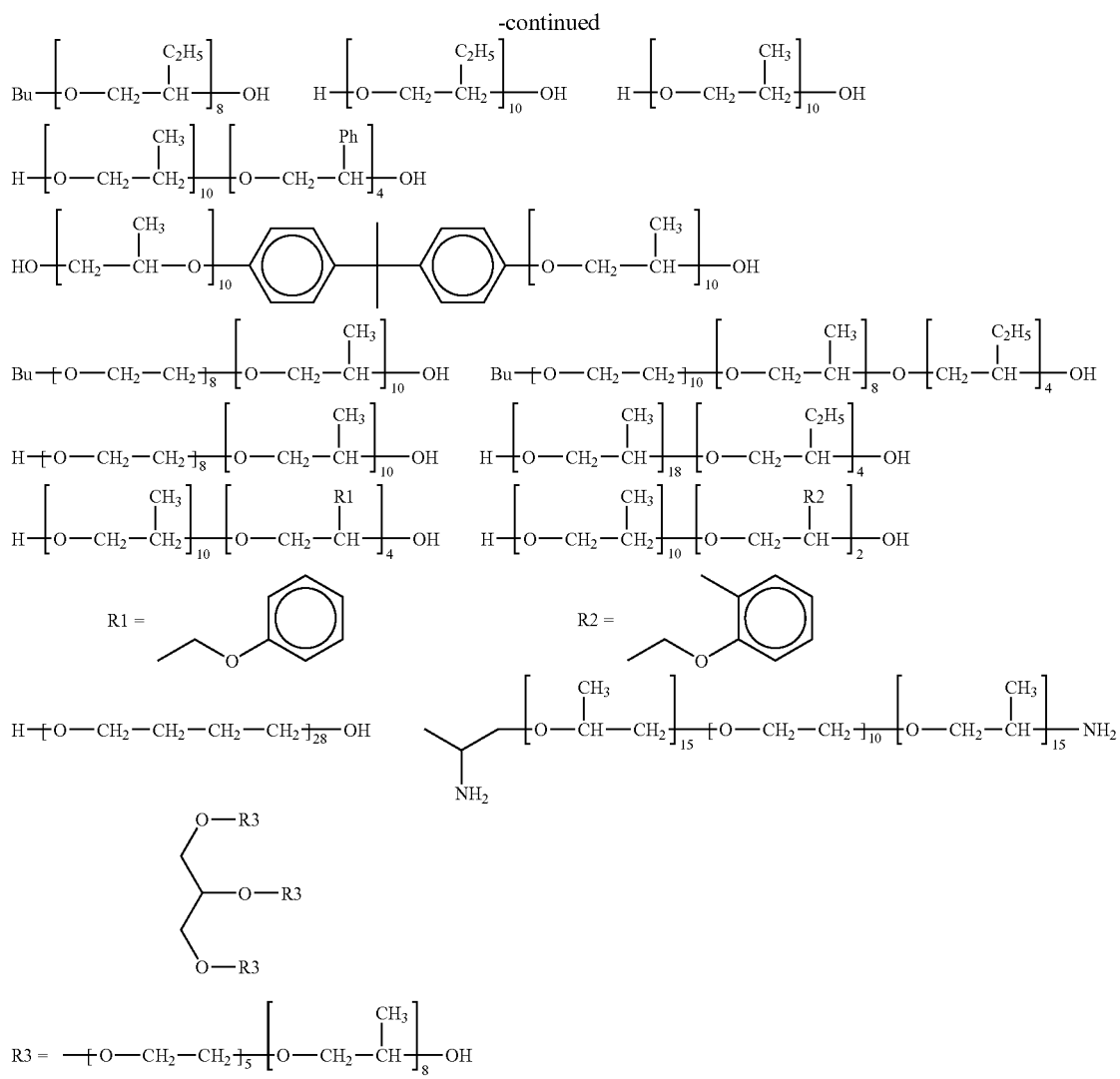

Further compounds (c) which carry at least one OH and/or NH$_2$ and/or NH function and/or other isocyanate-reactive groups, such as carboxyl or epoxide functions, are, for example, polyethers which are not included among the abovementioned hydrophilic or hydrophobic polyethers a) and b) used according to the invention, monohydric alcohols, such as methanol, ethanol, fatty alcohols, poly(ethylene-co-1,2-butylene)monool, fluorinated alcohols, such as C$_6$F$_{13}$—CH$_2$CH$_2$OH, alkylphenols, or polyhydric alcohols, such as 1,2-propanediol, 1,6-hexanediol, poly(ethylene-co-1,2-butylene)diol, poly(hexamethylene carbonate)diol, glucose, fructose, polyglycerol, polyester-monools or polyesterdiols, such as poly(caprolactone)diol or poly(hexamethylene phthalate)diol or fluorinated polyethers.

Further suitable compounds (c) are, for example, fatty acid-modified alcohols. These are dihydric or polyhydric alcohols in which some of the OH functions are esterified.

Further suitable compounds are primary and secondary amines having active hydrogen atoms, such as, for example, ethylamine, 1,6-hexamethylenediamine, diethylenetriamine, polyethyleneimine or, for example, poly(acrylonitrile-co-butadiene) having terminal amino groups.

Further suitable compounds (c) are, for example, fatty acid-modified amines. These are dihydric or polyhydric amines in which some of the amino groups are amidated.

Alkanolamines, such as, for example, diethanolamine or ethanolamine, are also suitable. Here too, some of the OH functions or the amine functions can be present in esterified or amidated form.

In order to enhance the surface activity of the stabilizers, organomodified siloxanes carrying alcohol or amine functions can also be used as further reactants. Suitable examples are, for example, OH-functional siloxanes, such as:

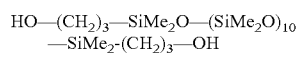

or aminosiloxanes, such as, for example:

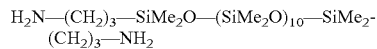

or polyethersiloxanes, such as, for example:

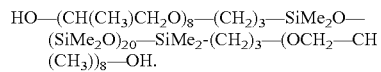

In order to be usable as a polyurethane foam stabilizer, the hydrophilic and hydrophobic polyalkylene blocks must be present in a balanced ratio, the composition of the different blocks also being of major importance. There is therefore a multiplicity of variants for the composition of a foam stabilizer which is as effective as possible.

The reaction of different polyethers with polyfunctional isocyanates permits the exact establishment of the ratio of hydrophilic to hydrophobic structural elements by the choice of the amount and the type of hydrophilic and hydrophobic polyethers. Furthermore, other types of diverse hydrophobic and hydrophilic structural elements can be selectively introduced by the introduction of further alcohols or amines. For example, a hydrophobic alkylene block forms with the use of 1,6-hexanediol, and a structural element having a carboxyl functionality forms by using dimethylolpropanoic acid.

In addition, certain structures can preferentially form by utilizing reactivity differences between different isocyanate functions in a polyfunctional isocyanate. For example, by the formation of prepolymers for the formation of certain block or branched structures.

The utilization of reactivity differences of various OH, $NH_2$ or NH functions permits the same.

Predictions about effectiveness of a foam stabilizer can be made only to a certain degree. A person skilled in the art is therefore constrained to try out the possible variations in a substantially empirical manner.

In addition to a pronounced emulsifying power, the polyether stabilizers according to the invention also have a high foam-stabilizing potential and are therefore outstandingly suitable as a polyurethane foam stabilizer. This applies in particular to flexible polyester foams and rigid polyurethane and polyisocyanurate foams.

WORKING EXAMPLES

The following examples are intended to illustrate the invention but by no means constitute a limitation.

Example 1

(LE 4944)

84 g of a hydrophobic polyetherdiol (M=about 2200 g/mol, w(EO)=10%) were mixed with 55 g of a hydrophilic polyethermonool (M=2000 g/mol, w(EO)=100%), and 11 g of isophorone diisocyanate were added. This mixture was heated to 90° C. and finally 0.15 g of dibutyltin laurate was added. Stirring was then effected for a further 4 hours at this temperature.

Example 2

(LE 4950): Linear with IDPI 66 g of a hydrophobic polyetherdiol (M=about 2200 g/mol, w(EO)=10%) were mixed with 24 g of a hydrophilic polyethermonool (M=1100 g/mol, w(EO)=100%), and 10 g of methylenediphenyl isocyanate were added. This mixture was heated to 90° C. and finally 0.1 g of dibutyltin laurate was added. Stirring was then effected for a further 4 hours at this temperature.

Example 3

(GP-J-139): Branched with Desmodur N 3300

34 g of a hydrophobic polyethermonool (M=about 1800 g/mol, w(EO)=0%) were mixed with 30 g of a hydrophobic polyetherdiol (M=about 2200 g/mol, w(EO)=10%) and 25 g of a hydrophilic polyethermonool (M=2000 g/mol, w(EO)=95%), and 11 g of Desmodur N 3300 (industrial trifunctional isocyanate from Bayer AG) were added. 100 g of propylene carbonate were then also added. This mixture was heated to 90° C. and finally 0.1 g of dibutyltin laurate was added. Stirring was then effected for a further 4 hours at this temperature.

Comparative Example 4

Pluronic 10400 (A-B-A block polyether from BASF AG) was used as a comparative example. The proportion by mass of ethylene oxide units is 40%.

Comparative Example 5

Vorosurf 504

Vorosurf 504 (A-B-A block polyether of butylene oxide and ethylene oxide from DOW) was used as a further comparative example.

For the following comparison, rigid polyurethane foams were produced in a closable metallic mold measuring 50×25×5 cm and thermostated at 60° C. by manual foaming of a polyurethane formulation comprising the following constituents:

| | | |
|---|---|---|
| 100.00 | pphp* | of modified aromatic polyesterpolyol (180 mg KOH/g) |
| 8.00 | pphp | of KOSMOS 75 (Goldschmidt GmbH) |
| 1.00 | pphp | of Kosmos 33 (Goldschmidt GmbH) |
| 0.50 | pphp | of TEGOAMIN PMDETA (Goldschmidt GmbH) |
| 0.70 | pphp | of water |
| 2.00 | pphp | of foam stabilizer |
| 10.00 | pphp | of tris(2-chloroisopropyl) phosphate |
| 19.00 | pphp | of n-pentane |
| 180.00 | pphp | of diphenylmethane diisocyanate, isomers and homologs (isocyanate content: 31), |

*pphp = parts per hundred parts

In a visual assessment, the rigid foams obtained were investigated with regard to the surface characteristic, internal defects and cell fineness. Furthermore, the average thermal conductivity (K factor) was determined by thermal conductivity measurement with the aid of a heat flow measurement in a temperature gradient (36° C./10° C.).

The results which have been obtained with the polyether copolymers according to the invention are compared with those of commercially available Si-free emulsifiers below.

| Stabilizer | Surface defects -top- | Surface defects -bottom- | Internal defects | Cell fineness | Thermal conductivity/ [mW/mK] |
|---|---|---|---|---|---|
| Example 1 | slight | moderate | moderate | very fine | 22.5 |
| Example 2 | slight | moderate | moderate | very fine | 22.4 |
| Example 3 | slight | moderate | moderate | very fine | 22.7 |

-continued

| Stabilizer | Surface defects -top- | Surface defects -bottom- | Internal defects | Cell fineness | Thermal conductivity/ [mW/mK] |
|---|---|---|---|---|---|
| Comparative example 4 | pronounced | extremely pronounced | moderate | fine | 30.1 |
| Comparative example 5 | slight | pronounced | moderate | very fine | 22.9 |

As is evident from the above table, the claimed compounds are suitable as foam stabilizers for the production of rigid foams. The extremely high stabilizing potential of the urethane-containing polyethers, which lead to a significant improvement of the surface characteristic in relation to the comparative examples, particularly in the bottom zone, is characteristic. In addition to the good emulsifying power, the high pentane retentivity of these compounds is presumably also responsible for the substantially less pronounced defect pattern. Furthermore, in comparison with comparative example 4, the rigid foams of these examples show finer cell structures which lead to significantly improved thermal conductivities.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A method of stabilizing a foam which comprises adding polyethers containing urethane or urea groups as foam stabilizers during the process of making the foam, wherein the polyethers containing urethane or urea groups is obtained by reacting
   A. at least one isocyanate with
   B. (a) at least one hydrophilic polyether which statistically carries at least one OH and/or $NH_2$ and/or NH function and
   (b) at least one hydrophobic polyether which statistically carries at least one OH and/or $NH_2$ and/or NH function and optionally
   (c) further compounds which carry at least one OH and/or $NH_2$ and/or NH function and/or other isocyanate-reactive groups,
   with the proviso that at least one isocyanate A is ≧difunctional;
   wherein at least one polyether of the general formula (I)

$$(R^1)_a[R^2[(E)_c\text{-}(P)_d\text{—}R^3]_b]_e \quad (I)$$

in which,
   $R^1$, in the case of a=1, is an e-functional nonreactive moiety of an initiator,
   $R^2$, independently of one another, are O, $NR^4$, NH or N,
   E is an ethoxy function,
   P are identical or different alkoxy function(s) having at least three carbon atoms,
   $R^3$ are identical or different radicals from the group consisting of H, $—C_fH_{2f}—N(R^4)H$ and $—C_fH_{2f}—NH_2$,
   $R^4$ are identical or different alkyl or aryl functions having 1 to 20 carbon atoms,
   a is 0 or 1,
   b is 1, 2 or 3,
   c is from 10 to 500,
   d is from 0 to 330,
   e is from 1 to 10,
   f is from 2 to 5,
   with the proviso that
   c>0.6 (c+d),
   is used as component a).

2. The method of claim 1, wherein at least one polyether of the general formula (I), in which
   c is from 0 to 400,
   d is from 10 to 500,
   with the proviso that
   c<0.45 (c+d),
   is used as component b).

3. The method of claim 1, wherein at least one polyether of the general formula (I), in which
   c is from 15 to 400,
   d is from 0 to 200,
   e is from 2 to 8,
   is used as component a).

4. The method of claim 1, wherein at least one polyether of the general formula (I), in which
   c is from 20 to 300,
   d is from 0 to 100,
   e is from 2 to 4,
   is used as component a).

5. The method of claim 1, wherein at least one polyether of the general formula (I), in which
   c is from 0 to 300,
   d is from 15 to 400,
   e is from 2 to 8,
   is used as component b).

6. The method of claim 1, wherein at least one polyether of the general formula (I), in which
   c is from 0 to 200,
   d is from 20 to 300,
   e is from 2 to 4,
   is used as component b).

7. The method of claim 1, wherein at least one polyether of the formulae

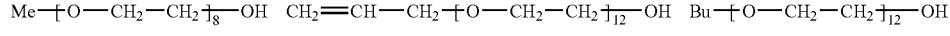

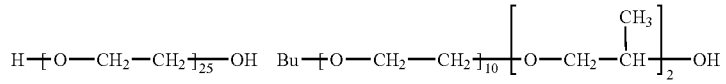

-continued

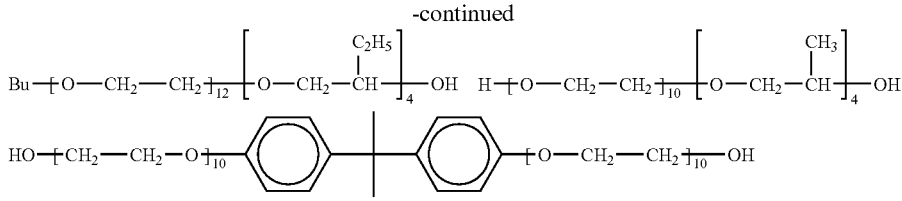

is used as component a).

8. The method of claim 1, wherein at east one polyether of the formulae

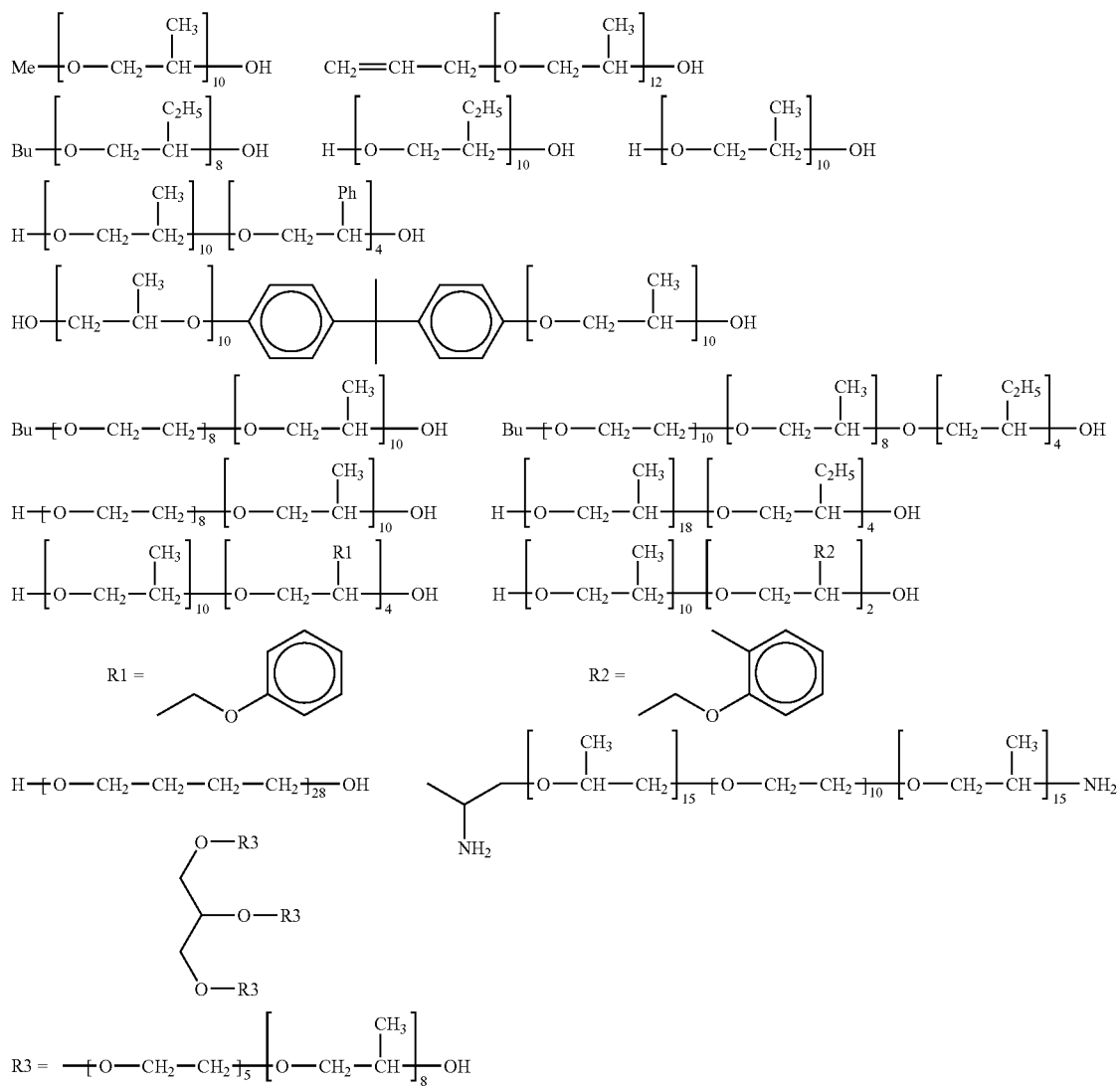

is used as component b).

9. The method of claim 1, wherein polyesterdiols are used as component c).

10. The method of claim 1, wherein

B. is (a) at least one hydrophilic polyether which statistically carries at least one OH and/or $NH_2$ and/or NH function and (b) at least one hydrophobic polyether which statistically carries at least one OH and/or $NH_2$ and/or NH function and optionally (c) further compounds which carry at least one OH and/or $NH_2$ and/or NH function and/or carboxyl or epoxide functional groups.

11. The method of claim 1, wherein

E is an ethoxy function which is the radical —(CH2-CH2-O), and $R^4$ are identical or different and are selected from the group consisting of methyl, ethyl and phenyl.

* * * * *

UNITED STATES PATENT AND TRADEMARK OFFICE
CERTIFICATE OF CORRECTION

| | | |
|---|---|---|
| PATENT NO. | : 8,030,366 B2 | Page 1 of 1 |
| APPLICATION NO. | : 11/851087 | |
| DATED | : October 4, 2011 | |
| INVENTOR(S) | : Michael Ferenz et al. | |

It is certified that error appears in the above-identified patent and that said Letters Patent is hereby corrected as shown below:

The following should be deleted from the cover page of the patent after section (54):
"USE OF POLYETHERS CONTAINING URETHANE FOR UREA GROUPS FOR STABILIZING POLYURETHANE FOAMS"

The following should be inserted on the cover page after section (54)

--USE OF POLYETHERS CONTAINING URETHANE OR UREA GROUPS FOR STABILIZING POLYURETHANE FOAMS--

Signed and Sealed this
Fifteenth Day of November, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,030,366 B2 | Page 1 of 1 |
| APPLICATION NO. | : 11/851087 | |
| DATED | : October 4, 2011 | |
| INVENTOR(S) | : Michael Ferenz et al. | |

It is certified that error appears in the above-identified patent and that said Letters Patent is hereby corrected as shown below:

Title Page, Item (54) and at Column 1, lines 1-3, Title:

"USE OF POLYETHERS CONTAINING URETHANE FOR UREA GROUPS FOR STABILIZING POLYURETHANE FOAMS"

should read

--USE OF POLYETHERS CONTAINING URETHANE OR UREA GROUPS FOR STABILIZING POLYURETHANE FOAMS--

This certificate supersedes the Certificate of Correction issued November 15, 2011.

Signed and Sealed this
Twentieth Day of December, 2011

David J. Kappos
*Director of the United States Patent and Trademark Office*